United States Patent [19]

Hoy et al.

[11] Patent Number: 4,677,168

[45] Date of Patent: Jun. 30, 1987

[54] WATER BORNE HIGH SOLIDS COATING COMPOSITIONS

[76] Inventors: Kenneth L. Hoy, 839 MacQueen Blvd., St. Albans, W. Va. 25177; Forrest A. Richey, Jr., Rte. 6, Box 138, Charleston, W. Va. 25311

[21] Appl. No.: 717,674

[22] Filed: Mar. 29, 1985

[51] Int. Cl.$^4$ .......................... C09D 3/58; C09D 3/52; C09D 3/66
[52] U.S. Cl. .................... 525/441; 525/452; 525/454; 525/456
[58] Field of Search ............... 525/441, 452, 454, 456

[56] References Cited

U.S. PATENT DOCUMENTS

| | | | |
|---|---|---|---|
| 3,392,129 | 7/1968 | Hoy | 524/601 |
| 3,412,054 | 11/1968 | Milligan et al. | 524/591 |
| 3,440,192 | 4/1969 | Hoy et al. | 528/295.5 |
| 3,455,806 | 7/1969 | Spoor et al. | 204/181.7 |
| 3,959,106 | 5/1976 | Bosso e al. | 204/181.7 |
| 3,962,165 | 6/1916 | Bosso et al. | 204/181.7 |
| 3,984,299 | 10/1976 | Jerabek | 204/181.7 |
| 4,096,127 | 6/1978 | Schurmann et al. | 525/454 |
| 4,136,075 | 1/1979 | Finn et al. | 524/561 |
| 4,297,476 | 10/1981 | Koleske | 525/441 |
| 4,322,328 | 3/1982 | Graetz et al. | 524/458 |
| 4,343,925 | 8/1982 | Chang et al. | 525/440 |
| 4,351,928 | 9/1982 | Smith | 525/443 |
| 4,390,658 | 6/1983 | Graetz et al. | 524/512 |
| 4,417,022 | 11/1983 | Chang et al. | 524/598 |
| 4,520,167 | 5/1985 | Blank et al. | 525/131 |
| 4,548,998 | 10/1985 | Chang et al. | 525/441 |

*Primary Examiner*—Ronald W. Griffin

[57] ABSTRACT

Water borne high solids coating compositions are made by blending a water-dispersible, crosslinkable organic polymer, water, at least one reactive carbamate derivative, a crosslinking agent and optionally a crosslinking catalyst. The resultant water borne high solids coating compositions can be either solutions or dispersions depending upon the particular polymer and reactive carbamate chosen as the reactive cosolvent or reactive diluent.

34 Claims, 3 Drawing Figures

FIG. 1

DIAGRAM OF WATER BORNE HIGH SOLIDS DISPERSION COATING

FIG. 2

FIG. 3

WATER BORNE HIGH SOLIDS COATING COMPOSITIONS

BACKGROUND OF THE INVENTION

This invention pertains to the preparation of high solids coating compositions and more particularly to the use of substituted carbamates as reactive cosolvents and/or reactive diluents together with water to form the liquid vehicle for the application of film forming polymers. The resultant water borne high solids, coating compositions can be either solutions or dispersions depending upon the particular polymer and substituted carbamate chosen as the reactive cosolvent or reactive diluent.

Water borne high solids coating compositions as used herein are coatings in which the principle application medium is a mixture of water and a nearly non-volatile organic material capable of reacting with the base film forming polymer and/or crosslinking agent. They may be of two types viz., (1) dispersions of organic polymers (latices) to which the co-reactive organic materials may also serve as filming aids, antifreeze agents, defoamers, etc.; and (2) solutions of organic polymers in which the thinner is a mixture of an organic co-reactive material (reactive cosolvent) and water. It is the intent of this invention to disclose the preparation of water borne high solids coating compositions in which the reactive organic material is also a solvent or dispersant as well as being essentially non-volatile and as a consequence many of the problems associated with the prior art "organic solvent borne" and "water borne coatings" are circumvented.

BACKGROUND ART

The employment of solutions or dispersions of organic polymers dissolved or dispersed in volatile organic liquids to formulate organic polymer coating compositions and their subsequent application onto various substrates as coatings thereon requires the handling and evaporation of large quantities of organic solvents. Because of the undesirable ecological and environmental problems and problems associated with the exposure of workers in the coatings industry to the organic solvents, alternate coatings methods become a necessity. Consequently there has been a shift to coating techniques where water is substituted for much of the volatile organic solvent or diluent in the coating composition. These are often referred to as "water borne" coating compositions even where water is not the sole dispersing or dissolving vehicle for the organic polymer.

The rise in the use of water borne coatings has introduced problems peculiar to systems containing a mixture of water and organic cosolvent or dispersant. These problems arise from the fact that the evaporation of water is dependent upon the ambient humidity conditions, and the relative rates of evaporation of the organic solvent via à vis water.

Polymers which were developed for water borne coatings systems are often based on the chemistry of the polymers used in existing solvent systems. Thus alkyds, epoxy esters, and oil modified polyurethanes originally developed for nonaqueous formulations were modified for aqueous formulations by the incorporation of acid moieites.

One of the earliest techniques for the incorporation of acid groups was to maleinize a long oil alkyd or epoxy ester. In this process the alkyd or polyester is reacted at 200°-260° C. for 30-60 minutes with maleic anhydride in the presence of an excess of drying acid. The excess drying acid serves as a reactive chain transfer agent to prevent premature gellation. Accelerators, commonly iodine or sulfur dioxide, were often employed in this thermal polymerization process. The maleic anhydride moiety (now a succinate) is hydrolyzed and neutralized with volatile and/or fixed bases to render the polymer soluble in the water/cosolvent mixture. Enough unsaturation was left in the resin for siccative cross-linking of the final film.

Another early technique was to use dimethylol propionic acid (derived by condensation of propanal with formaldehye followed by oxidation). This unique acid-diol along with the monoglyceride is reacted with the phthalic anhydride or isophthalic acid to form a polyester/alkyd having free acid groups. The carboxyl moiety of the dimethylol propionic acid is sterically hindered and does not esterify during the polymerization but reacts subsequently with the neutralizing base thus solubilizing the polymer.

Oil modified urethanes are produced by substitution of a diisocyanate for the phthalic anhydride. The urethane reaction is carried out at moderate temperatures (50°-100° C.). These types of polymers form the basis of water borne coatings materials used today in low cost product and consumer finishes.

The next innovation was the development of resins that could be cross-linked by reaction with aminoplasts. These resins contained available hydroxyl functionality as well as an ionizable moiety. The acid containing polymers were used early in electro-coating, and were synthesized by partially esterifying an epoxy resin with a drying fatty acid followed by reaction with trimellitic anhydride. The carboxyl groups incorporated were neutralized in the usual manner. Esterification of the partial epoxy ester with para-aminobenzoic acid in place of trimellitic anhydride yielded early cationic polymers. The cationic polymers are commonly neutralized with acetic, lactic and other volatile organic acids to attain solubility.

Today the resins are highly specialized for their intended applications. Techniques for the incorporation of the ionic moieties into polymers include graft polymerization of carboxylic vinyl monomers to the base epoxy and polyester backbones as well as the development of functionalized telechelic polymers from readily available monomers.

As the coatings industry moves, because of environmental and health regulations, from the more conventional solvent coatings to water borne and high solids systems, there has developed a need for new water borne reactive diluents and reactive cosolvents to serve this emerging technology. At the present time many of these end use needs are being addressed by solvents and reaction materials already in commerce. However, none of these materials were designed for these applications; rather the industry adapted what was available. For example many of the prior art resin solvents used in water borne coating systems led to degraded polymer properties in the final coatings. Today the state of the art has advanced to the point where the real needs are apparent and further improvement in the coating systems require improved reactive co-solvents and reactive diluents.

The term "water borne coatings" as used herein is intended to mean coatings in which the principal application medium is water. They may be of two types: (1) dispersions in which organic materials are added at low levels as filming aids, antifreeze additives, defoamers, etc.; (2) solutions in which part of the application medium is an organic solvent. Performance requirements demand that coatings resist the adverse effects of water in the environment and yet water borne solution coatings are applied from a solution which contains a large fraction of water. Therefore the coating resins cannot be truly water soluble; rather, a number of techniques are employed to maintain solubility throughout application and film formation. The techniques commonly employed are:

(a) Ionic groups are incorporated into the polymer,
(b) A means of crosslinking the film after application is employed,
(c) A cosolvent is used to maintain solubility of the polymer throughout the film forming process.

In the case of solution coatings, it is imperative that during the drying stage, after a particular substrate has been covered with a layer of coating composition that a single phase be maintained until the water and cosolvent components have evaporated away leaving the now insoluble organic polymer deposit.

It is also necessary that the cosolvent be miscible with the water and that the organic polymer coatings be soluble in the cosolvent.

The relative volatility of the cosolvent with respect to water involves vapor pressure, molecular weight and the relative humidity during the drying operation.

Under high humidity conditions the rate of water evaporation becomes very slow while the evaporation of the volatile organic co-solvent remains relatively constant. Consequently under conditions of high humidity, coatings imperfections develop during film formation which are detrimental to the overall performance of the coating. These imperfections which form under high humidity conditions are related to the limited solubility of the film forming polymers in the resulting water rich composition. The problem becomes understandable when it is cast in terms of the phase chemistry of a water borne coating.

Figure 1:
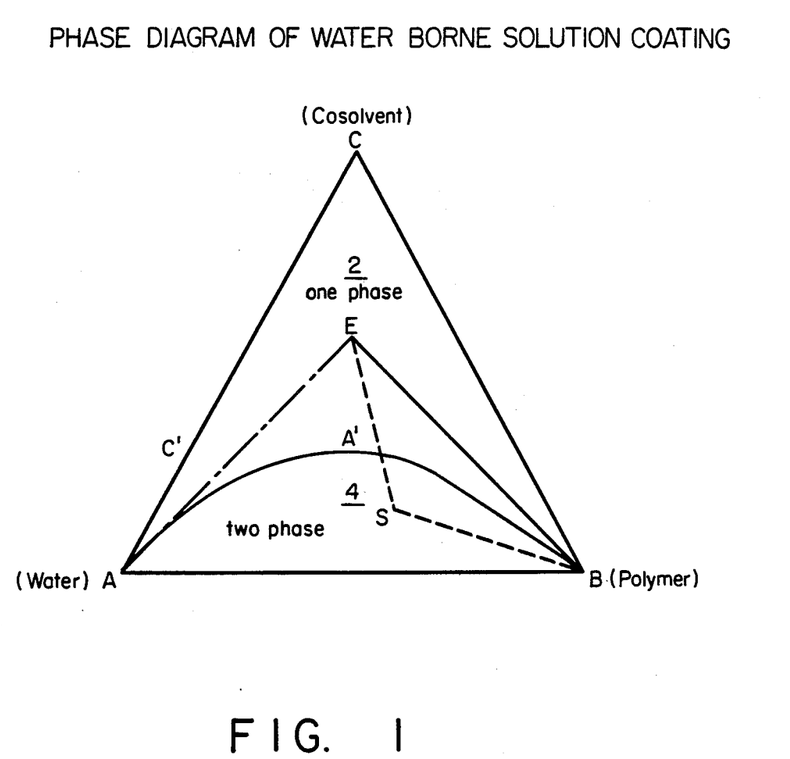

A simplified phase diagram of a hypothetical water borne system is illustrated in FIG. 1. FIG. 1 is a phase diagram representing water as A, the cosolvent as C and the film forming polymer as B. The area of a single phase, 2, is separated from the area of two phases, 4, by the curved line A-A'-B. The point E represents the application composition of the water borne system. In the case of a volatile cosolvent under ideal conditions (low humidity) the straight line E-B represents the changing composition during film formation. Under conditions of high humidity the dotted line E-S-B illustrates that the film formation pathway has taken an excursion into the two phase region which causes premature coagulation of the film forming polymer and results in coating imperfections.

The points illustrated by FIG. 1 are:
(i) The cosolvent is miscible with water; line AC is in the one phase region in its entirety.
(ii) The coatings polymer is soluble in the cosolvent; line CB is in the one phase region in its entirely.
(iii) Film formation must take place in such a manner that the phase boundry, A-A'-B, is not crossed.
(iv) Lastly, it is often desired to clean the application equipment with water alone, which means the phase boundry, A-A'-B, must be avoided during cleaning; line EA.

In real systems the phase diagrams are more complicated than illustrated. The shape of the two phase region is more irregular and is not as predictable as indicated. The model does, however, provide a framework for understanding solubility relationships and provides a common basis for understanding the objective of the present invention.

It is an object of this invention to provide nonvolatile, reactive organic materials which are also solvents or diluents suitable for the preparation of water borne high solids coating compositions.

It is another object to provide reactive solvents/reactive diluents which serve to provide high solids coating compositions in the form of either solutions or aqueous dispersions.

It is still another object to provide reactive solvents/reactive diluents which will not degrade the polymers used in the coatings compositions or the properties of the finished coating.

Other objects will become apparent to those skilled in the art upon a further reading of the specifications.

Figure 2:
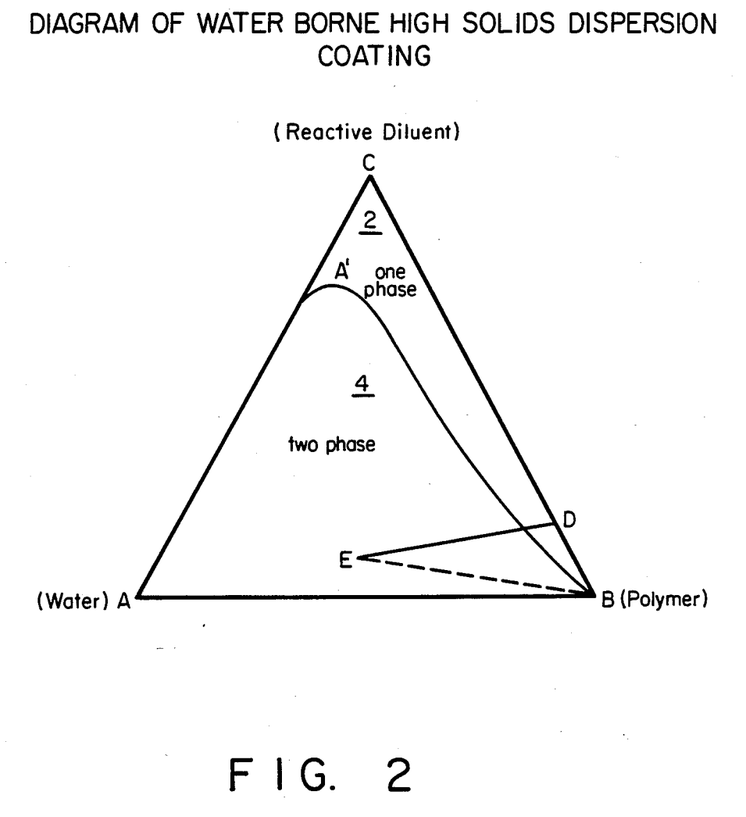

Water borne high solids coatings avoid many of the problems referred to earlier. Again the advantage of water borne high solids coatings compositions can be illustrated by use of phase diagrams. Since water borne high solids coatings may be either of the dispersion type or in the solution type, two different phase diagrams will be required to understand the phase relationships. FIG. 2 is a simplified, hypothetical phase diagram of a water borne high solids dispersion coating composition, representing water as A, the reactive diluent as C, and the polymer including a crosslinking agent as B. The area of single phase, 2, is separated from the area of two phases, 4, by the curved line A-A'-B. The point E represents the application composition of the water borne high solids dispersion coating. The straight line E-D represents the changing composition during film formation; the dashed line E-B is the film forming pathway that the water borne coating of the prior art would take.

The salient features of the phase diagram are:
(i) The reactive diluent need not be totally soluble in water, but rather is distributed between the aqueous phase and the polymer phase.
(ii) The reactive diluent is essentially non-volatile and becomes a part of the final coating and consequently the total non-volatiles (total solids) in the composition in the final film point D, is equal to the sum of the polymer including the crosslinker and the reactive diluent.
(iii) The film forming pathway proceeds from a homogeneous, stable two phase composition to a single phase and therefore the reactive diluent must be compatible with (soluble in) the polymer phase.

Figure 3:
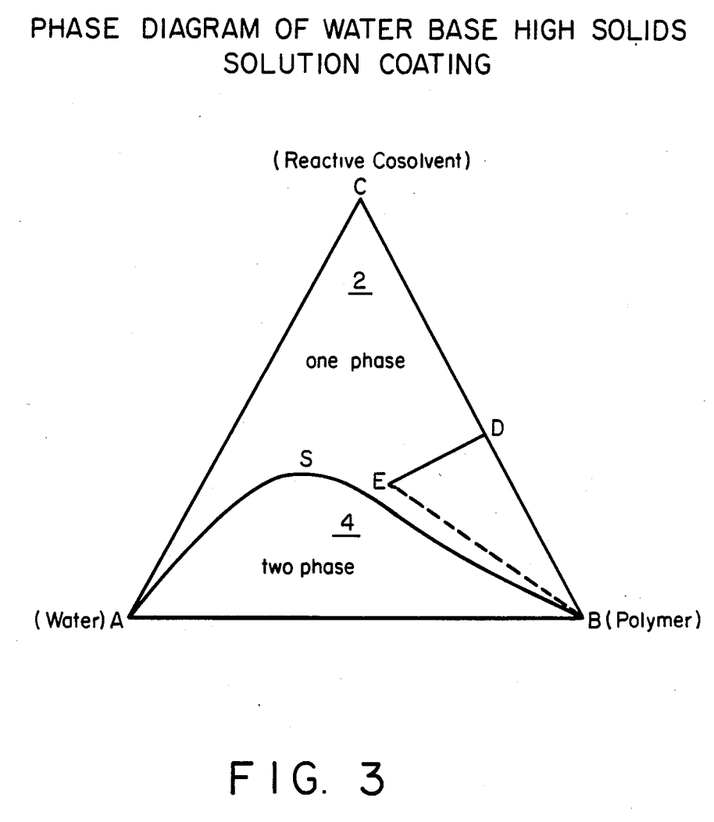

FIG. 3 is a phase diagram of a water borne high solids solution coatings composition representing water as A, the reactive cosolvent as C, and the polymer including the crosslinking agent as B. The area of single phase, 2, is separated from the area of two phases, 4, by the curved line A-S-B. The point E represents the application composition of the water borne high solids solution coating. The straight line E-D represents the changing compositions during the film formation process.

The notable features of FIG. 3 are:
(i) The reactive cosolvent is generally miscible with water; line A-C is in the one phase region in its entirety.

(ii) The coatings polymer is soluble in the reactive cosolvent; line CB is in the one phase region in its entirety.

(iii) Film formation can result only from the removal of water (evaporation) and hence the film formation remains in the single phase region thus avoiding the high humidity film defects of the prior art.

(iv) The reactive cosolvent is essentially non-volatile and becomes a part of the final coating and consequently, the total (non-volatiles) total solids, in the film composition, point D, is equal to the sum of the polymer including the crosslinking agent and the reactive cosolvent.

In both cases the reactive diluent and/or reactive cosolvent becomes a part of the final coating and as such must contribute to, not detract from, the overall coatings performance. The reaction product of polymer, reactive diluent and/or reactive cosolvent with the crosslinking agent must have suitable properties such as toughness, adhesion, impact resistance, abrasion resistance, scratch resistance, resistance to solvents, chemicals, acids, bases, and have good color, gloss and stability as is required according to the end use application. This is well understood by those skilled in the art.

SUMMARY OF THE INVENTION

Water borne high solids coating compositions meeting the objects above can be prepared by blending;

(1) at least one water dispersible, crosslinkable organic polymer;

(2) water;

(3) at least one reactive carbamate derivative having the generic formula;

wherein
each of $R_1$ and $R_2$ is a monovalent radical selected from the class consisting of hydrogen, alkyl groups having 1 to about 10 carbon atoms, hydroxyalkyl groups having 2 to about 4 carbon atoms and one or more hydroxyl groups, and hydroxypolyalkyleneoxy groups having one or more hydroxyl groups, and $R_3$ is a monovalent radical selected from the class consisting of alkyl groups having 1 to about 10 carbon atoms, hydroxyalkyl groups having 2 to about 4 carbon atoms and one or more hydroxyl groups, and hydroxypolyalkyleneoxy groups having one or more hydroxyl groups and with the provisos that said carbamate contains at least one —NH and one —OH group or at least two OH groups and that $R_1$ and $R_2$ or $R_1$ and $R_3$ can be linked to form a ring structure;

(4) a crosslinking amount of a crosslinking agent; and (5) optionally a catalytic amount of crosslinking catalyst.

Except for hydrogen, the monovalent radicals may be substituted with ether, halogen, quaternary ammonium, phosphonium, sulfonium and like substituents.

Suitable water dispersible organic polymers for use in the present invention include anionically, cationically, and entropically stabilized polymers which contain a plurality of reactive —OH and/or —NHCO— groups. The prior art contains a plenitude of routes for incorporation of the entities required to impart homogeneous water dispersibility into various organic polymers. The following list is by no means complete, but will serve to illustrate some of the more important routes to obtain operable polymers.

Anionically stabilized polymers were probably the earliest water borne polymers. Hoy et al. (U.S. Pat. No. 3,392,129) teaches the use of carboxylation of unsaturated fatty acid ester of polyether polyols and their subsequent neutralization with organic amine bases to render the polymer soluble in a water/cosolvent blend. Hoy and Payne (U.S. Pat. No. 3,440,192) describes the preparation of water borne fatty acid polyesters by the introduction of carboxyl groups. Milligan and Hoy (U.S. Pat. No. 3,412,054) demonstrates the synthesis of water borne polyurethanes via the reaction of dimethyolpropionic acid and subsequent neutralization. Schurmann et al. (U.S. Pat. No. 4,096,127) describes the use of tertiary ammonium dimethyolpropionate to prepare polyurethanes thus avoiding the subsequent neutralization step. Shell Chemical Co. in their trade publication of 1965 describe water borne coating from partial fatty acid epoxy esters and their subsequent reaction with trimellitic anhydride. Jerabek (U.S. Pat. No. 3,984,299) shows the reaction of primary and secondary amines with an epoxy resin to produce a polymer which when neutralized with acetic or lactic acid provided a water borne cationically stabilized polymer. In a like manner Bosso and Wismer (U.S. Pat. Nos. 3,962,165 and 3,959,106) shows the reaction of sulfides and phosphines to give products which could be converted to sulfonium and phosphonium water dispersible salts with organic acids. Kempter et al, Fatipec Congress (1978), describe the preparation of a Mannich base polyamine from bis phenol-A, formaldehyde and a lower alkyl secondary amine; the resultant Mannich base was reacted with an epoxy resin to form a pendant amine containing polymer, which was soluble when acid neutralized in a water/cosolvent blend. Spoor et al (U.S. Pat. No. 3,455,806) describes the polymerization of dialkylaminoethyl methacrylate with methyl methacrylate, and hydroxyethyl methacrylate to make a cationically stabilized acrylic polymer. This is the cationic analogue of an anionic acrylate made from methacrylate or acrylic acid and neutralized with amines as described typically by Finn et al. (U.S. Pat. No. 4,136,075). Graetz et al (U.S. Pat. No. 4,322,328) describes entropically stabilized water borne latexes from acrylate monomers using the methacrylic acid ester of the monomethyl ether of polyethyleneglycol, mole wt. 2000, as the key generator of the entropic barrier. They describe the use of these sterically stabilized dispersions in the water borne coatings. The common feature of all of these methods is that homogeneous water dispersible polymers are obtained each of which is capable of having a plurality of reactive —OH and/or —NHCO— groups which provide for inter polymerization with the subject carbamates and the cross linking agent.

Preferred water dispersible, crosslinkable organic polymers for use in this invention include:
Polyester alkyd resins
Carboxylated hydroxyl-containing epoxy fatty acid esters
Carboxylated polyesters
Carboxylated alkyd resins
Carboxylated vinyl interpolymers
Homogeneously dispersed acrylic interpolymers.

The ratio of the amounts of water and reactive diluent or cosolvent used to prepare the coating compositions is dictated by the type of water borne coating desired. Thus in the aqueous dispersion type, the amount of reactive diluent is usually determined by the film properties desired. Usually these can be attained by ratios of reactive diluent/water in the range of about 5/95 to about 30/70. On the other hand in the solution type the ratio of reactive cosolvent to water is limited by the solubility characteristics of the water dispersible polymer. Thus a hydrophilic polymer would require less reactive cosolvent while a more hydrophobic polymer would require more. Generally, polymers of these types are soluble in a blend of reactive cosolvent/water of about 20/80 to about 60/40. In practice the base coating may be formulated at rather high ratios of reactive cosolvent/water i.e., about 60/40 to about 90/10 and then let down with water to attain application viscosities. One skilled in the art can easily establish the optimum ratios for a particular coating composition with a minimum of experimentation. The amount of organic polymer used in these compositions is not narrowly critical. However a practical range for the solution type is about 15 to about 45% by weight of polymer with the amount of reactive solvent being about 10 to about 20% by weight, the amount of crosslinking agent being about 10 to about 30% by weight and the amount of water being about 60 to about 5% by weight.

A practical range of organic polymer used for the dispersion type of coating composition is about 35 to about 50% by weight, with the amount of reactive diluent being about 5 to about 20% by weight, the amount of crosslinking agent being about 5 to about 20% by weight and the amount of water being about 55 to about 10% by weight.

The reactive carbamate derivatives in the coating composition claimed herein can be designated as either reactive cosolvents or reactive diluents depending on the type of coatings formed. In the case of coating composition which are dispersions, the carbamates function as reactant diluents. In the case of coatings compositions which are solutions, the carbamates function as reactive cosolvents.

The term reactive is used herein to mean that the carbamate derivatives can be incorporated into the finished coating by crosslinking agents which cure through NH and/or OH groups.

The reactive carbamates used in this invention may be represented by the following:

2-hydroxyethyl 1-butylcarbamate
2-hydroxyethyl methylcarbamate
1-hydroxy-2-propyl 1-propylcarbamate
2-hydroxy-1-propyl 1-propylcarbamate
1-hydroxy-2-propyl 1-butylcarbamate
2-hydroxy-1-propyl 1-butylcarbamate
2-methyl-1-propyl 2-hydroxyethylcarbamate
2-propyl bis(2-hydroxyethyl)carbamate
2-hydroxyethyl 2-hydroxyethylcarbamate
2-hydroxyethyl (2-hydroxyethyl)(ethyl)carbamate
2,3-dihydroxy-1-propyl dimethylcarbamate
2,3-dihydroxy-1-propyl ethylcarbamate
1,3-dihydroxy-2-propyl 1-butylcarbamate
2,3-dihydroxy-1-propyl tetramethylenecarbamate
2-hydroxyethyl bis-(2-hydroxyethyl)carbamate
3-(2,3-dihydroxy-1-propyl)oxazolidone
5-(hydroxymethylene)oxazolidone
3-(2-hydroxyethyl)-5-(hydroxymethylene)oxazolidone
4-(hydroxymethylene)oxazolidone
2-hydroxyethyl carbamate
1-butyl 2,3-dihydroxy-1-propylcarbamate
1-hydroxy-2-propyl 2-ethyl-1-hexylcarbamate
2-hydroxy-1-propyl 2-ethyl-1-hexylcarbamate Illustrative of suitable crosslinking agents for the water borne high solids coating compositions described herein are water soluble or water dispersible polyepoxides, such as the glycidyl epoxides or cycloaliphatic epoxides (Araldite ®297, Epon ®582, etc.) and the water dispersible aminoplasts such as the reaction product of an aldehyde (e.g. formaldehyde, acetaldehyde, paraformaldehyde, trioxane etc.) with urea, thiourea, melamine, benzoguanamine, acetoguanamine, dicyandiamine and the like. The aminoplasts may be etherified with a lower alcohol such as methyl ethyl, butyl, isobutyl, propyl or isopropyl alcohol. Aminoplasts which are of particular value in anionically stabilized water borne high solids coatings compositions are the methylated urea-formaldehyde resins, the alkylated benzoguanamines and methylated melamine-formaldehyde resins with the latter being the most desirable.

The choice of catalysts suitable for the practice of this invention is dictated by the choice of crosslinking reaction. Thus if aminoplasts are employed to crosslink the organic polymer and reactive carbamate an acidic catalyst is preferred. Illustrative of the acidic catalyst of the invention are one or more of the following: alkysulfonic acids such as methane sulfonic acid, ethane sulfonic acid and the like, arylsulfonic acids such as p-toluene sulfonic acid, alkylaryl sulfonic acids such as a $C_{10}$ to $C_{18}$ alkylbenzene sulfonic acid, sulfamic acid, dialkyl hydrogen phosphates such as diamyl hydrogen phosphate, aryl hydrogen phosphates such as diphenyl hydrogen phosphate and phosphoric acid itself. Often these catalysts are rendered water dispersible by neutralization with lower alkyl amines.

When cationically stabilized water dispersible organic polymers are employed the basic character of the base resin retards the reaction with an aminoplast and extremely high temperatures must be employed. To circumvent this problem the blocked isocyanates are often employed to crosslink these polymers. The polymer isocyanates have been extensively reviewed by Wicks (Prog. Org. Chem., 3, 73 (1975)). A blocked isocyanate is an isocyanate adduct which is stable at ambient conditions but dissociates to regenerated isocyanate functionality under the influence of heat. Temperatures of 120° to about 250° C. are necessary to release the blocking groups which are usually volatilized from the coating. The dissociation temperature of blocked isocyanates based on commercially utilized blocking agents decrease in the order: epsilon-caprolactam, phenols, methyl ethyl ketoxime, and active methylene compounds. Blocked isocyanates which are stable and water dispersible have been described by Rosthauser and Williams (Proceedings Polymeric Materials Science and Engineering; Vol. 50, pg. 344 (1984)). Catalysts which promote the urethane reaction are well known to the art and are illustrated by tertiary amines such as triethyl amine, bis(dimethylaminoethyl)ether and the like, organometallic salts of tin, mercury, zinc, bismuth and the like such as dibutyl tin diacetate, zinc octoate, phenyl mercuric acetate and bismuth octoate.

The amount of catalyst required to promote the reaction is dependent upon the curing conditions required in the coating process. Those skilled in the art may readily determine the catalyst level with a minimum of experimentation. In practice if a catalyst is desired it is usually in the level of 0.02 to about 1% based on the weight of the water dispersible organic polymer.

Background of the curing relations of hexamethoxymethylmelamine may be found in an article by R. Saxon et al. in J. Appl Poly. Sci., 8, 475 (1964).

The invention is further described in the examples which follow. All parts and percentages are by weight unless otherwise specified.

EXAMPLE 1

Preparation of 2-Hydroxyethyl 1-Butylcarbamate 274.8 Grams of ethylene carbonate (3.12 moles) were placed in a round bottom flask equipped with stirrer, thermometer, addition funnel and reflux condenser. 228.2 Grams (3.12 mole) of butylamine were charged to the addition funnel and added to the stirred contents of the flask at a rate sufficient to maintain them at 50°–80° C. Crude product purity by gas chromatography was 90.6 area % after the mixture had been allowed to stand overnight. Stripping in a rotary evaporator gave 449.9 g. of product of 92.3 area % purity. The yield, corrected for purity, was 83.1%. A portion of the material was distilled at 2 mm Hg boiling from 124° to 126° C. and having area % purity 95.1%.

2-hydroxyethyl 1-butylcarbamate is a good solvent for a polyester resin (Cargill #7451).

EXAMPLE 2

Preparation of 2-Hydroxyethyl Methylcarbamate

44 Grams (0.5 mole) of ethylene carbonate were placed in a 250-ml round bottom flask equipped with stirrer, addition funnel, and thermometer. 38.75 Grams of 40% aqueous methylamine (15.5 g., 0.5 mole contained methylamine) were charged to the addition funnel and added to the flask with stirring over 1.25 hr. and with the flask contents at 38° to 52° C. The resulting mixture was subjected to vacuum distillation giving 42.54 g. (35.7%) of clear, colorless liquid product boiling at 140° C. at 8 mm Hg. The infrared spectrum of this material was consistent with the proposed structure. Purity by gas chromatography was 97.8 area %. The product had a melting point of approximately −36° C. and was miscible with water.

EXAMPLE 3

Preparation of Hydroxypropyl Butylcarbamates 290.96 Grams (2.85 moles) of propylene carbonate were charged to a 2-l., round bottom flask equipped with stirrer, heater, thermometer, addition funnel and reflux condenser. 211.3 Grams (2.85 moles) of butylamine were charged to the addition funnel and slowly added to the flask contents. The maximum temperature of the reaction was 98° C. The material was allowed to stand and a sample submitted for infrared analysis. The infrared spectrum was consistent with the proposed structures (i.e. an isomeric mixture of 2-hydroxy-1 and -2-propyl 1-butylcarbamates). The proposed structures given above were confirmed by Proton NMR analysis.

EXAMPLE 4

Hydroxyethyl Butylcarbamate/Cargill-7451 Resin Crosslinked by Cymel-303

A water borne high solids coatings composition was prepared by dissolving 17.08 parts of a carboxylated water dispersible organic polymer (Cargil ®-7451) in 10.60 parts of hydroxyethyl butylcarbamate with stirring and heating to about 80° to 100° C. under a blanket of nitrogen. To the resulting solution was added 1.15 parts of triethylamine and then diluted with 49.65 parts of water. To this solution was added 21.52 parts of aminoplast (Cymel ®-303, American Cyanamid) to make a total of 100 parts. Catalyst was added 0.179 parts/100 parts of water dispersible carboxylated polymer. The resultant coatings composition contained 49.2% non-volatiles land was cast (wet film thickness 1.2 mils) on a steel panel and cured at 375° F. for 30 minutes. A tough, hard, glossy coating resulted. A similar coating was prepared on aluminum foil and by extraction was found to be over 98% insoluble in boiling toluene. The VOC (volatile organic compounds emitted during curing) of the coatings composition was 0.50 lbs/gal most of which results from the methanol released from the cross linking agent during the curing cycle.

EXAMPLE 5

Comparative Water Borne Coatings Composition

A comparative coatings composition of the prior art was made by dissolving 21.02 parts of the carboxylated water dispersible organic polymer (Cargil-7451) in 13.04 parts of butoxyethanol with stirring at about 80° C. under a blanket of nitrogen. To the resulting solution was added 1.41 parts of triethylamine and 61.09 parts of water. To this solution was added 3.44 parts of Cymel-303 (American Cyanamid) to make a total of 100 parts. Catalyst was added, 0.179 parts per 100 parts of the organic polymer. The resulting coating composition contained 25.8% non-volatiles, was cast (1.2 mils wet film thickness) on a steel panel and was cured at 375° F. for 30 minutes. A tough, hard, glossy coating resulted. A similarly cast film on aluminum foil was found to over 98% insoluble in boiling toluene. The VOC of this prior art coating was 1.25 lbs/gal which resulted from the volatile solvent butoxyethanol and the methanol released from the crosslinking agent. Thus it is apparent by comparison with Example 4 that the objectives of the present invention have been demonstrated.

EXAMPLE 6

Preparation of Hydroxypropyl Propylcarbamates

722 Grams (7.0 moles @ 99% purity) of propylene carbonate were charged to a 2 1 round-bottom flask equipped with stirrer, heating mantle, thermometer, feed tank and distillation head. The flask and contents were heated with stirring under nitrogen to 50° C. At this point addition of 436 grams (7 moles @ 98% purity) of n-propylamine was begun and continued for a total of 3.25 hrs. during which time the temperature was maintained between 50° and 62° C. without external heat. The temperature was then raised to 72° C. and held at this value for an additional 3 hrs. then the flask and contents were allowed to cool and stand overnight. Lights were removed by heating to a maximum temperature of 105° C. under 2 mm Hg pressure during 1 hr. with stirring.

Gas chromatograhic analysis of the stripped product resulted in 96.8 area % of a single peak.

EXAMPLE 7

Synthesis of 2-Hydroxyethyl 2-Ethylhexylcarbamate

When example 1 is followed except that a chemically equivalent amount of 2-ethylhexyl amine is substituted for n-butylamine, 2-hydroxyethyl 2-ethylhexylcarbamate is obtained.

EXAMPLE 8

Synthesis of 2-Hydroxypropyl 2-Ethylhexylcarbamates

When example 6 is followed except that a chemically equivalent amount of 2-ethylhexylamine is substituted for n-propylamine, an isomeric mixture of 1-hydroxy-2-propyl 2-ethyl-1-hexylcarbamate and 2-hydroxy-1-propyl 2-ethyl-1-hexylcarbamate is obtained.

EXAMPLE 9

Preparation of 2-Methyl-1-Propyl 2-Hydroxyethylcarbamate

An equimolar mixture of di(2-methyl-1-propyl)carbonate and ethanolamine is allowed to react resulting in formation of 2-methyl-1-propyl 2-hydroxyethylcarbamate.

EXAMPLE 10

Synthesis of 2-Hydroxyethyl 2-Hydroxyethylcarbamate

When example 1 is followed except that a chemically equivalent amount of ethanolamine is substituted for n-butylamine, 2-hydroxyethyl 2-hydroxyethylcarbamate is obtained.

EXAMPLE 11

Synthesis of Butyl 2,3-Dihydroxypropylcarbamate

An equimolar mixture of dibutylcarbonate and 3-amino-1,2-propanediol was allowed to react resulting in formation of butyl 2,3-dihydroxypropylcarbamate.

EXAMPLE 12

When Example 4 is followed except that a chemically equivalent amount of an isomeric mixture of 1-hydroxy-2-propyl 1-butylcarbamate and 2-hydroxy-1-propyl 1-butylcarbamate is substituted for 2-hydroxyethyl 1-butylcarbamate a hard, glossy, tough coating is obtained.

EXAMPLE 13

When Example 4 is followed except that a chemically equivalent amount of an isomeric mixture of 1-hydroxy-2-propyl 1-propylcarbamate and 2-hydroxy-1-propyl 1-propylcarbamate is substituted for 2-hydroxyethyl 1-butylcarbamate a hard, glossy, tough coating is obtained.

EXAMPLE 14

Preparation of 5-(Hydroxymethylene)Oxazolidone and 5-Hydroxypyrazolidone

An equimolar mixture of 3-amino-1,2-propanediol and diethyl carbonate is allowed to react resulting in a mixture containing 5-(hydroxymethylene)oxazolidone and 5-hydroxypyrazolidone.

EXAMPLE 16

Preparation of 2-hydroxyethyl 3-hydroxy-2,2-dimethyl-1-propylcarbamate

An equimolar mixture of ethylene carbonate and 3-amino-2,2-dimethyl-1-propanol is allowed to react resulting in a mixture containing 2-hydroxyethyl 3-hydroxy-2,2-dimethyl-1-propylcarbamate.

Although the invention has been described in its preferred forms with a certain degree of particularity, it is understood that the present disclosure has been made only by way of example and that numerous changes can be made without departing from the spirit and the scope of the invention.

We claim:

1. Method of making water borne high solids coating compositions which comprises blending:
   (A) at least one water dispersible, cross-linkable organic polymer;
   (B) water;
   (C) at least one reactive carbamate derivative having the generic formula:

wherein each of $R_1$ and $R_2$ is a monovalent radical selected from the class consisting of hydrogen, alkyl groups having 1 to about 10 carbon atoms, hydroxyalkyl groups having 2 to about 4 carbon atoms and one or more hydroxyl, and hydroxypolyalkeneoxy groups having one or more hydroxyl groups, and $R_3$ is a monovalent radical selected from the class consisting of alkyl groups having 1 to about 10 carbon atoms, hydroxyalkyl groups having 2 to about 4 carbon atoms and one or more hydroxyl groups and hydroxypolyalkeneoxy groups having one or more hydroxyl groups, with the provisos that said carbamate contains at least one —NH and one —OH group or at least two —OH groups, and that $R_1$ and $R_2$ or $R_1$ and $R_3$ can be linked to form a ring structure; and (D) a cross-linking amount of a cross-linking agent selected from the group consisting of a water-soluble polyepoxide, a water-dispersible polyepoxide and a water-dispersible aminoplast.

2. Method claimed in claim 1 wherein $R_1$ is hydrogen, $R_2$ is methyl and $R_3$ is hydroxyethyl.

3. Method claimed in claim 1 wherein the organic polymer is a polyester alkyd resin.

4. Coating composition made by the method claimed in claim 1.

5. Method claimed in claim 1 wherein the crosslinking agent is hexamethoxymethylmelamine.

6. Method claimed in claim 5 wherein the crosslinking catalyst is p-toluenesulfonic acid.

7. Method as claimed in claim 1 wherein the coating compositions also include a catalytic amount of a cross-linking agent.

8. Method claimed in claim 1 wherein $R_1$ is hydrogen, $R_2$ is butyl and $R_3$ is hydroxyethyl.

9. Method claimed in claim 1 wherein $R_1$ is hydrogen, $R_2$ is butyl and $R_3$ is hydroxypropyl.

10. Method claimed in claim 1 wherein $R_1$ is hydrogen, $R_2$ is 2-ethylhexyl and $R_3$ is hydroxyethyl.

11. Method claimed in claim 1 wherein $R_1$ is hydrogen, $R_2$ is isobutyl and $R_3$ is hydroxyethyl.

12. Method claimed in claim 1 wherein $R_1$ is n-propyl and $R_2$ and $R_3$ are each hydroxyethyl.

13. Method claimed in claim 1 wherein $R_1$ is hydrogen and $R_2$ and $R_3$ are each hydroxyethyl.

14. Method claimed in claim 1 wherein $R_1$ is hydrogen, $R_2$ hydroxyethyl and $R_3$ is 2-hydroxy-1-propyl.

15. Method claimed in claim 1 wherein $R_1$ and $R_2$ are each methyl and $R_3$ is 2,3-dihydroxy-1-propyl.

16. Method claimed in claim 1 wherein the organic polymer is a carboxylated, hydroxyl containing epoxy fatty acid ester.

17. Method claimed in claim 1 wherein the organic polymer is a carboxylated polyester.

18. Method claimed in claim 1 wherein the organic polymer is a carboxylated alkyd resin.

19. Method claimed in claim 1 wherein the organic polymer is a carboxylated vinyl interpolymer.

20. Method claimed in claim 7 wherein the organic polymer is a homogeneously dispersed acrylic interpolymer.

21. Method of coating substrates with organic polymers which comprises:
   (1) containing said substrates with a coating composition prepared by blending:
      (A) at least one water dispersible, crosslinkable organic polymer;
      (B) water;
      (C) at least one reactive carbamate derivative having the generic formula:

wherein
   each of $R_1$ and $R_2$ is a monovalent radical selected from the class consisting of hydrogen, alkyl groups having 1 to about 10 carbon atoms, hydroxyalkyl groups having 2 to about 4 carbon atoms and one or more hydroxyl groups and hydroxypoolyalkyleneoxy groups having one or more hydroxyl groups, and
   $R_3$ is a monovalent radical selected from the class consisting of alkyl groups having 1 to about 10 carbon atoms, hydroxyalkyl groups having 2 to about 4 carbon atoms and one or more hydroxyl groups and hydroxypolyalkyleneoxy groups having one or more hydroxyl groups,
   with the proviso that said carbamate contains at least one —NH and one —OH group or at least two —OH groups, and that $R_1$ and $R_2$ or $R_1$ and $R_3$ can be linked to form a carbon ring structure:
      (D) a crosslinking amount of a crosslinking agent selected from the group consisting of a water-soluble polyepoxide, a water-dispersible polyepoxide and a water-dispersible aminoplast.

22. Method claimed in claim 21 wherein $R_1$ is hydrogen, $R_2$ is methyl and $R_3$ is hydroxyethyl.

23. Method claimed in claim 21 wherein the organic polymer is a polyester alkyd resin.

24. Method as claimed in claim 21 wherein the coating compositions also include a catalytic amount of a cross-linking catalyst.

25. Method claimed in claim 21 wherein $R_1$ is hydrogen, $R_2$ is butyl and $R_3$ is hydroxyethyl.

26. Method claimed in claim 21 wherein $R_1$ is hydrogen, $R_2$ is butyl and $R_3$ is hydroxypropyl.

27. Method claimed in claim 21 wherein $R_1$ is ethyl, $R_2$ is hydrogen and $R_3$ is hydroxyethyl.

28. Method claimed in claim 21 wherein $R_1$ is hydrogen, and $R_2$ is isobutyl and $R_3$ is hydroxyethyl.

29. Method claimed in claim 21 wherein $R_1$ is propyl, $R_2$ and $R_3$ are hydroxyethyl.

30. Method claimed in claim 21 wherein $R_1$ is hydrogen, $R_2$ and $R_3$ are each hydroxyethyl.

31. Method claimed in claim 21 wherein the organic polymer is a carboxylated, hydroxyl containing epoxy fatty acid ester.

32. Method claimed in claim 21 wherein the organic polymer is a carboxylated polyester.

33. Method claimed in claim 21 wherein the organic polymer is a carboxylated vinyl interpolymer.

34. Method claimed in claim 21 wherein the organic polymer is a homogeneously dispersed acrylic interpolymer.

* * * * *